(12) United States Patent
Atencio (10) Patent No.: US 9,850,740 B2
(45) Date of Patent: Dec. 26, 2017

(54) HYDRASEAL FRAC VALVE

(71) Applicant: Don Atencio, Farmington, NM (US)

(72) Inventor: Don Atencio, Farmington, NM (US)

(73) Assignee: Fracmaster, LLC, Houston, TX (US)

( * ) Notice: Subject to any disclaimer, the term of this patent is extended or adjusted under 35 U.S.C. 154(b) by 555 days.

(21) Appl. No.: 13/869,744

(22) Filed: Apr. 24, 2013

(65) Prior Publication Data

US 2014/0318807 A1   Oct. 30, 2014

(51) Int. Cl.
  *E21B 34/02*   (2006.01)
  *F16K 3/20*    (2006.01)
  *E21B 34/00*   (2006.01)

(52) U.S. Cl.
  CPC .............. *E21B 34/02* (2013.01); *E21B 34/00* (2013.01); *F16K 3/207* (2013.01)

(58) Field of Classification Search
  CPC .......... E21B 34/00; E21B 34/02; F16K 3/207
  See application file for complete search history.

(56) References Cited

U.S. PATENT DOCUMENTS

| | | | | |
|---|---|---|---|---|
| 1,476,344 A | * | 12/1923 | McGee | F16K 3/207 126/285 A |
| 3,044,741 A | * | 7/1962 | Grove | F16K 3/207 251/172 |
| 3,095,004 A | * | 6/1963 | Jackson, Jr. | F16K 3/36 137/246.11 |
| 3,181,552 A | * | 5/1965 | Jackson, Jr. | F16K 3/207 137/246.12 |
| 3,367,625 A | * | 2/1968 | Fortune | F16K 3/207 251/172 |
| 4,136,710 A | | 1/1979 | Bond | |

\* cited by examiner

*Primary Examiner* — Robert E Fuller
(74) *Attorney, Agent, or Firm* — Ramey & Schwaller, LLP (57) ABSTRACT

A valve seal assembly can be energized by external pressure, such as by hydraulic pressure introduced via injection ports, so as to press the seal assembly against a gate with enough force to block paths where sand and chemicals would otherwise enter the valve body cavity or void. The external pressure makes the parts of the seal assembly move like a piston, forcing the seat of the seal assembly to press against the gate, eliminating the machined tolerances or gaps required for the gate to be opened or closed. A separate valve seal assembly can be provided for each face of the gate, and both assemblies can be activated when the gate is in an open position (fluid is flowing through the valve), and an upstream valve seal assembly can be activated alone when the gate is in a closed position.

18 Claims, 6 Drawing Sheets

HYDRASEAL FRAC VALVE

RELATED APPLICATIONS

This application claims the benefit of U.S. Provisional Application No. 61/638,623, filed Apr. 26, 2012, entitled HYDRASEAL SANDLOCK VALVE, the specification of which is incorporated by reference.

BACKGROUND OF THE INVENTION

Field of the Invention (Technical Field)

The presently claimed invention relates to oil and gas equipment, and more particularly to an apparatus and method to block or prevent debris, chemicals, and sand from entering the internal body cavity of hydraulic fracturing (fracking or frac) equipment and valves.

Background Art

In the oil and gas industry there is a practice called fracking, to speed up the migration of gas and petroleum fluid from source rocks or reservoir rocks. This is a process where high pressure pumps and powerful engines pump sand, water and/or chemicals through high pressure flow lines, valves, and equipment that are attached to fracking devices known in the industry as a frac valve, frac stack or frac equipment, hereinafter referred to collectively as a frac valve. A frac valve can be configured in many different sizes and pressure ratings. Each design is usually specific to the user's application and requirements. Frac valves are attached to a wellhead that is attached to a high-pressure pipe that can extend thousands of feet into the ground and cemented into gas or oil formations. These devices are attached to the wellhead by bolting or other well-known means of fastening and are tightened to a predetermined torque by hydraulics or hammer tools.

The fracking process requires high pressure pumps to push the fracturing fluids, including proppants, a material such as grains of sand, ceramic, or other particulates, that prevent the fractures from closing when the injection is stopped, into the injected fluid and chemicals through the frac valves for several hours or days; depending on the amount of proppants and fluids required to be injected into the ground at high pressures, and velocity to break up and create cracks in the formation.

Figure 1:
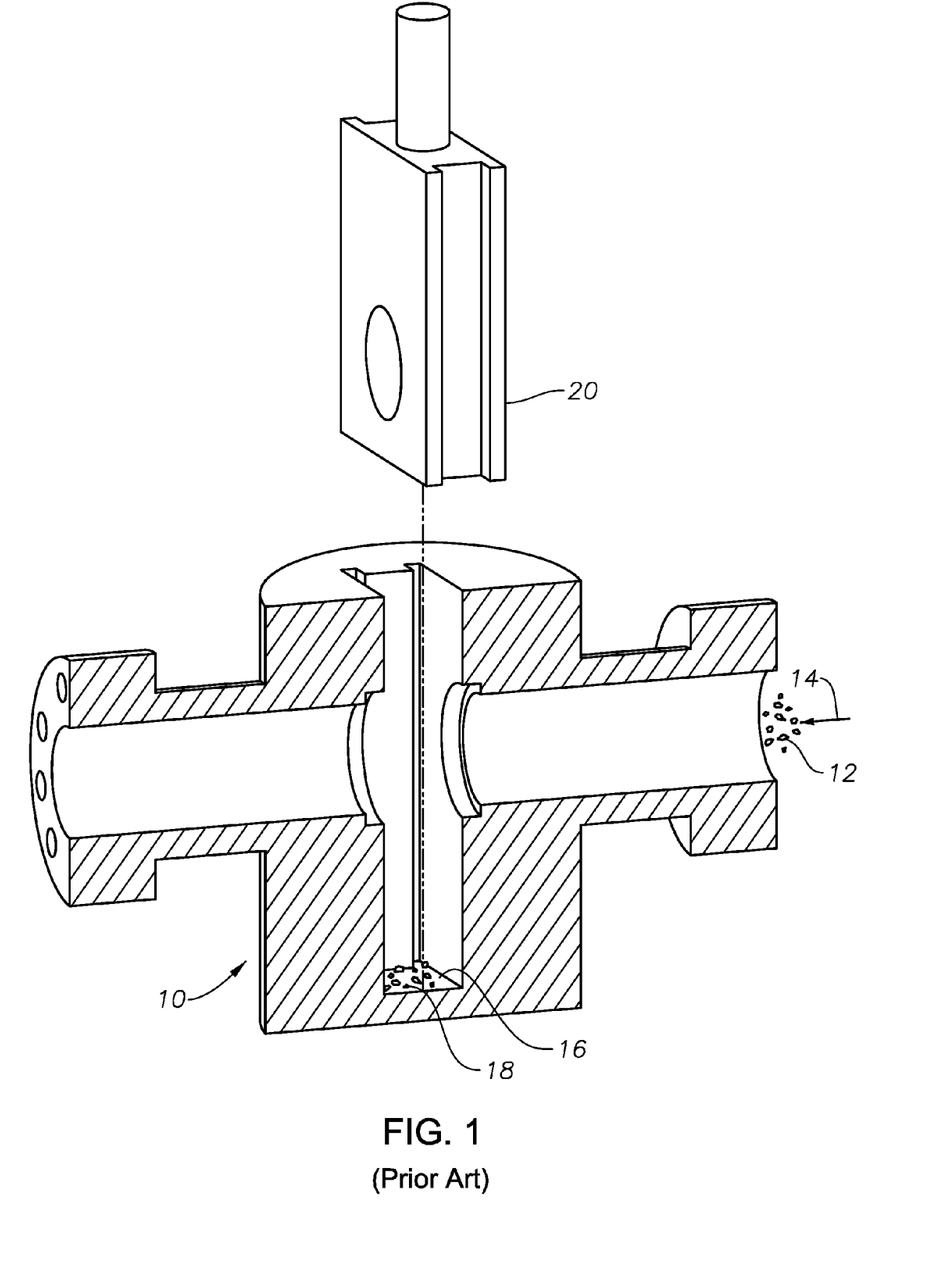
FIG. 1 shows a cut-away view of prior art valve configuration.

A typical frac valve 10 is shown in FIG. 1. During the fracking process, abrasive proppants, fluids, and chemicals 12 are able to flow 14 through the bores of frac valve 10 at high pressures and high velocities and into the casing wellbore and finally into the formation. During this process, cavities 16 of frac valve 10 also allows proppants 12 to pass into the valve body cavity 16, an area or void behind the mechanical moving parts. This allows the injection fluid to travel into the valve bore cavity and fill with debris 18, such as the frac sands and chemicals. Once the chemicals and sand work their way into the cavities and bores, or spaces between parts, which are required for any moving part to function properly, many problems occur that cause the equipment to wear, malfunction, fail or become inoperable. This can cause a dangerous situation to life and/or the environment.

A typical frac valve 10 as shown in FIG. 1, is used to contain and shut off pressure to perform special or specific functions during a frac operation by opening and closing gate 20, by raising to allow the flow or lowering to stop the flow, by means of a hand operated wheel or by means of air or hydraulic actuators. The high pressure is sealed off by closing the gate during or after the fracturing operation.

There are many points in the current design of frac valves 10, which still require improvements despite the fact that the known frac valves have been commercially successful and have lessened dangers in operation.

First, frac valves 10 and other associated high-pressure valves must be operated under or with high pressure. Additionally, sometimes frac valves 10 require high torque to force the gate opened and closed at high pressures that are pressing against the open or closed gate 20 of the frac valve 10. Typical prior art frac stack valves 10 fill with debris 18 during the fracturing process by debris leaking through the connection between the gate and the valve aperture, and may not allow valve gate 20 to fully open or close, creating a dangerous or unsafe environment.

While frac stack valves 10 and fittings have tightly controlled inside and outside parameters, there must be looser tolerances in order for a frac valve gate 20 to travel in and out of the valve body cavity 16. Accordingly, due to these loose tolerances, gate 20 cannot properly seal against or seat on one or both sides of gate 20 during the open position and one side during the closed position. Conversely, the tolerances and packing or seal may fit loosely against the gate face but may be too loose and thus, susceptible to permitting proppant chemical or debris to enter valve body cavity 16 during the fracturing process. This causes operational problems, which include the inability to fully close gate 20, to fully open gate 20, or damage to the seal surface of gate 20, by corrosion, washed seats or the like.

Presently, attempts to solve this problem include pumping heavy and expensive greases or sealants in the bore or cavities in order to prevent or block pathways by installation of devices or springs that apply force against the parts to limit the tolerances. The shortcomings of injecting special greases or sealants fails to prevent the problems of debris collection, corrosion, and the injection must be repeated each time a valve is cycled. Therefore, there is a need for an apparatus and method for effectively blocking the pathways for debris entering a valve body cavity during a fracking operation without jeopardizing the normal operation of the valve.

SUMMARY OF THE INVENTION
(DISCLOSURE OF THE INVENTION)

The presently claimed invention solves the aforementioned problems by providing an apparatus and method to mechanically energize at least one seat to move and press against the gate with enough force and pressure to prevent and block the passage of fluids and debris from entering into the body of the valve cavity.

The presently claimed invention provides a seat seal piston apparatus, to facilitate the insertion of pressure into an energizer ring, which engages and forces the seat to seal against the gate with enough force to block and lock debris and fluids in the bore of the valve and prevent the debris and fluids from entering the body cavity in an open or closed gate configuration. When the energizer ring is deactivated, the gate can be reset to a new position.

An object of the presently claimed invention is to mechanically compress or energize valve seats, to achieve a mechanical seal independent of well bore pressure, generally needed to affect seal and block debris from entering cavity or internal parts of valves that could cause the valve to malfunction.

Advantages of the presently claimed invention are increased safety and environmental protection, decreased repair or maintenance costs, and increased life of the equipment.

Other objects, advantages, and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are schematic and not necessarily drawn to scale, etc. Further, the drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

The term "HydraSeal Frac Valve" is defined as an apparatus or system to block proppants, debris, and chemicals from entering into the valve body cavity by using a seat engagement or energizer ring. The energizer ring is installed in the bottom end of the seat assembly with a series of seals. The energizer ring provides a method for the seat seal assembly to provide a piston effect, whereby, pressure is introduced between the energizer ring and the seat causing the seals to press against the gate. It is important that the seals be capable of withstanding the high pressures prevailing at the wellhead and often generated by hydraulic fracking The preferred embodiment is shown in FIGS. 2-6. This embodiment allows external pressure to be introduced, and compresses the internal parts with enough force to block any paths where sand and chemical debris travel into the cavities of fracking equipment. The pressure is introduced by hydraulic forces into the body bushing, causing it to move like a piston forcing all the parts to compress together, thus, eliminating the mechanical tolerances required for the gate to move for opening and closing. The compression caused by introducing external hydraulic pressures blocks any and all pathways for the flow of the fluids other than through the valve.

Figure 2:
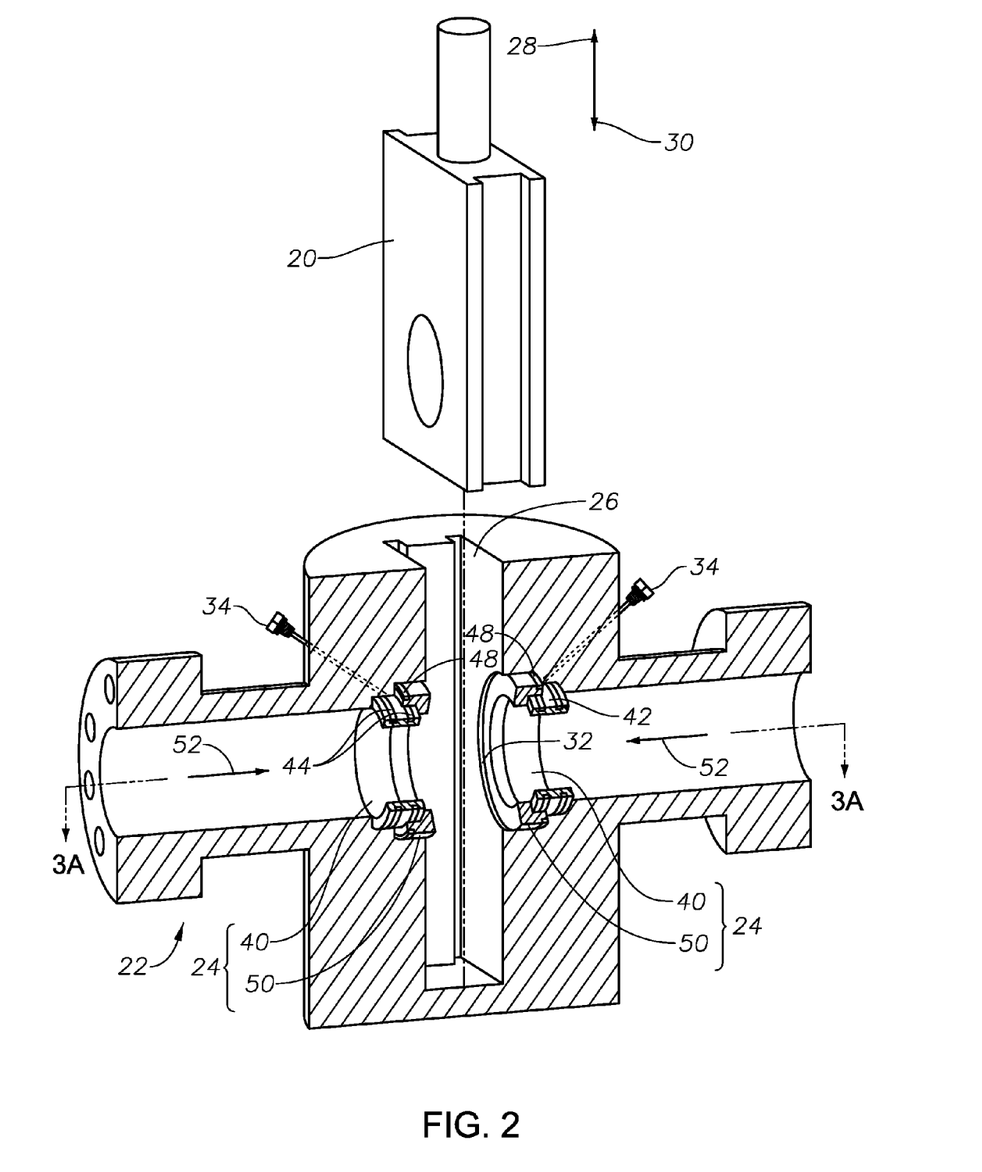
FIG. 2 is a cut-away view of modified frac valve with the energizable seal assemblies installed.

An off the shelf frac valve, as shown in FIG. 1, is modified as shown in FIG. 2. In this embodiment, gate 20 is provided to open and close as indicated in the background art section of this disclosure. Modified valve 22 has a vertical machined bore 26 for operation of valve gate 20. Gate 20 typically moves downwards 30 to close (prevent the fluid flow) and upwards 28 to open (initiate fluid flow) (described further with reference to FIG. 6 below). The modifications to the prior art valve are shown in FIG. 2. Modified valve 22 is machined to insert two substantially identical energizable seal assemblies 24 into modified valve 22, one on either side of gate 20, as shown. Modified valve 22 has horizontally machined bores 32, or pockets, for installation of energizable seal assemblies 24, respectively. Each seal assembly 24 includes an energizer ring bushing 40, at an outward (i.e., farther from gate 20) portion of pocket 32, and a valve seat 50, at an inward (i.e., closer to gate 20) portion of pocket 32. (Elements 42 and 44, of or associated with element 40, and element 48, associated with element 50, are described below.) In FIG. 2, each seal assembly 24 is in the unsealed position, hence the gap (in the horizontal direction) between valve seat 50 and gate 20, visible, e.g., at the termination of the lead line for reference numeral 32 (this gap is also indicated by reference numeral 56 in FIG. 6 discussed below). Injection ports 34 are machined in modified valve 22 to inject pressure from an outside source to pass into seal assembly 24 for activation, i.e., for energizing seal assembly 24. Although two injection ports 34 are show for simplicity, any number of injection ports 34 can be used. The injection ports 34 are shown in part in phantom (with dotted lines) in FIG. 2; the thin tubular portions of the injection ports 34 shown mostly in phantom lie behind the plane of the cross-section of the valve body, extend through the valve body, and terminate at the outer circumferential surfaces of the energizer ring bushings 40, respectively (described further below). Note that injection ports 34 are shown unthreaded in FIGS. 2 and 6 in order to more fully show these elements; in operation, injection ports 34 would be threaded into valve 22, as seen in FIGS. 3A and 5.

Figure 3A:
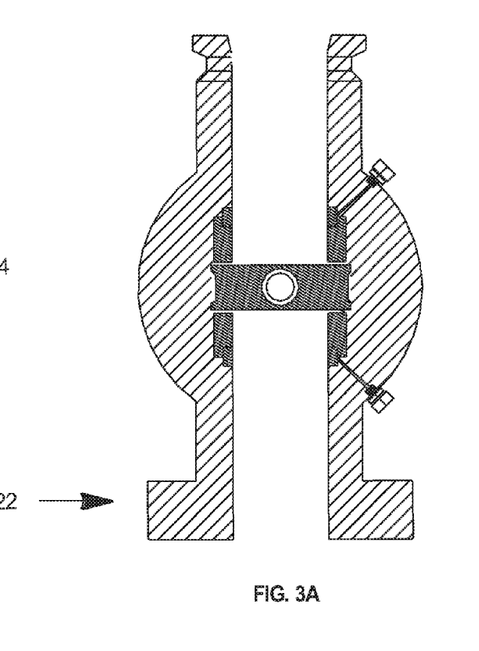
FIG. 3A is a generally planar cross-sectional view of a modified frac valve such as shown in FIG. 2, taken along the line 3A-3A in FIG. 2.
Figure 3B:
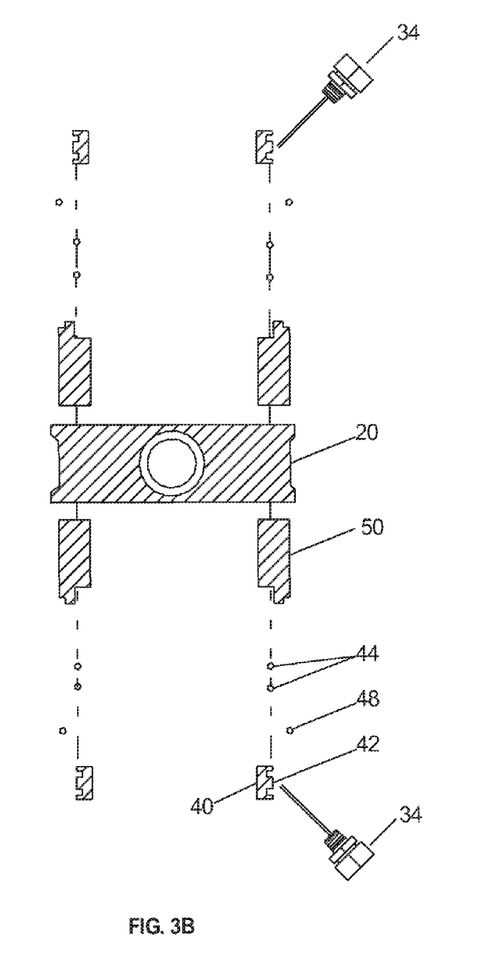
FIG. 3B is an exploded view of the structure shown in FIG. 3A with some addition and some omission of detail.
Figure 4A:
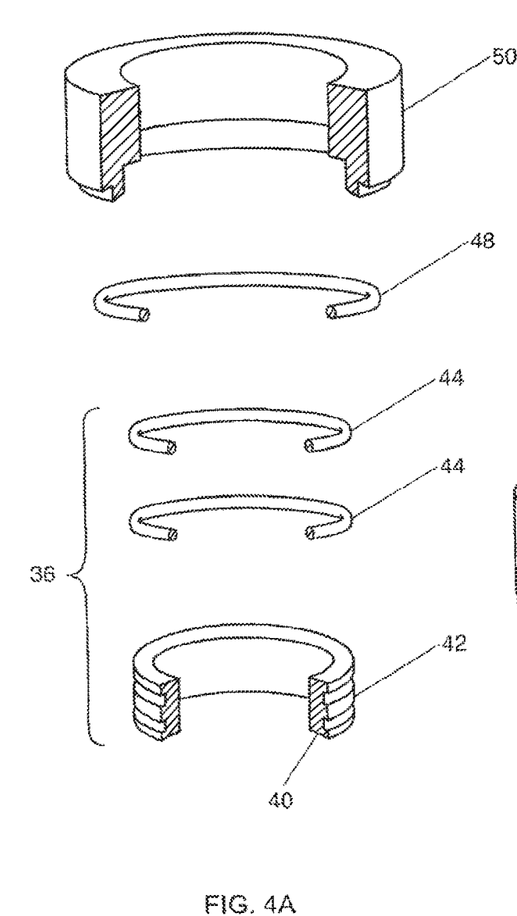
FIG. 4A shows an exploded, cut-away, perspective view of energized an energizable seal assembly.
Figure 4B:
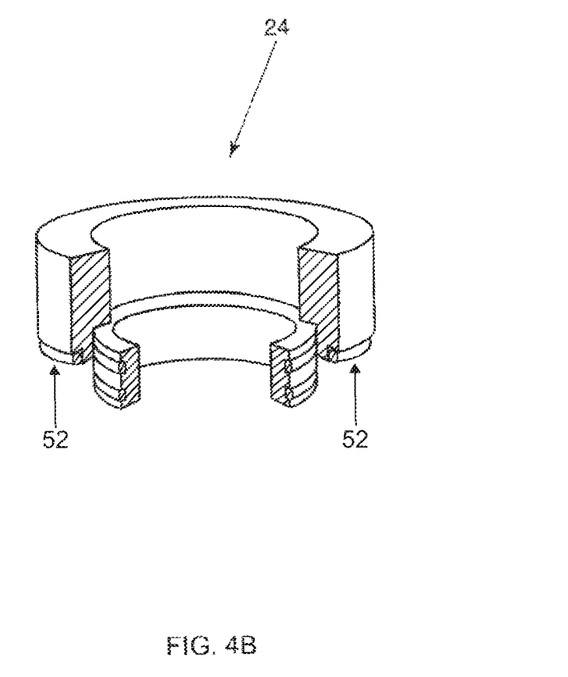
FIG. 4B is a cut-away view showing the energizable seal assembly of FIG. 4A in a completed state.

An energizable seal assembly 24 is shown in FIGS. 3A, 3B, 4A, and 4B. FIG. 3A is a generally planar cross-sectional view of a modified frac valve such as shown in FIG. 2, taken along the line 3A-3A in FIG. 2. Note that, as a planar cross-sectional view, FIG. 3A shows a view of the plane taken along the line 3A-3A in FIG. 2; it does not show the three-dimensional structure extending downward in FIG. 2 beneath the plane. FIG. 3B is an exploded view (again, planar cross-sectional) of the structure shown in FIG. 3A, omitting the valve body walls but adding the seals shown in FIG. 4. Note that in FIGS. 3A and 3B gate 20 is shown inserted in the valve, in contrast to FIG. 2, and injection ports 34 are shown not in cross-section. (As seen in FIG. 2, the valve body may be understood as comprising a generally cylindrical portion having a longitudinal axis thereof extending horizontally in FIG. 2, and vertical machined bore 26 having a longitudinal axis thereof, shown by the dotted line, extending vertically in FIG. 2, the generally cylindrical portion and the vertical machined bore 26 being perpendicular to one another, and the vertical machined bore 26 being configured for gate 20 to be slidably inserted therein, slidably removed therefrom, and slidably adjustable in the vertical direction (of FIG. 2), as indicated by arrows 28 and 30.) FIG. 4A shows an exploded, cut away, perspective view of energizable seal assembly 24, and FIG. 4B is a cutaway view showing the energizable seal assembly of FIG. 4A in a completed (i.e., assembled) state. As best shown in FIG. 4A, energizer ring assembly 36 comprises an energizer ring bushing 40, an energizer ring spacer 42, and two energizer assembly seals 44. Energizer ring assembly 36 may also comprise an energizer ring bushing cap, which may be formed integrally with energizer ring bushing 40 as the end portion thereof, disposed at the end thereof opposite the end thereof closest to the gate 20. Spacer 42 may also be formed integrally with energizing ring bushing 40 as a portion thereof. Two energizer ring assemblies 36 are installed respectively in the two outward portions of horizontal pockets 32 located in modified valve 22.

For each valve seat 50, a valve seat seal 48 is installed onto the back of the respective valve seat 50. Two valve seats 50 are installed respectively in the two inward portions of pocket bores 32 and (circumferentially) over (i.e., partly radially outward of) the two installed energizer ring assemblies 36. Each seal assembly 24, comprising a valve seat 50 (and associated seal 48) and an energizer ring assembly 36, forms a piston effect moving inward towards the center of modified valve body 22 and valve gate 20 to seal against valve gate 20. As will be understood, elements 40, 42, 44, 48 and 50 shown in FIGS. 4A and 4B (and discussed further below) are in fact annular members (rings). In FIGS. 2, 4A and 4B, a circumferentially extending portion of each of these members is cut away and not shown, in order to show the structure/configuration of their cross-sections. In at least some embodiments, the inner circumferential walls of elements 40 and 50 are substantially flush with the inner circumferential walls of the bore body of the valve that define the fluid flow path, as seen in FIGS. 2, 3A and 5. Put in other words, in at least some embodiments, the inner circumferential walls of elements 40 and 50 do not substantially project or protrude outward (convexly) into the flow path, and also do not have a substantial recess, depression, or concavity such as would effectively substantially enlarge/widen the flow path. This feature whereby the inner circumferential walls of the seal assembly 24 are substantially flush with the inner circumferential walls of the bore body of the valve is shown in FIG. 5 by the fact that the inner circumferential walls of the flow path and the inner circumferential walls of elements 40 and 50 lie on the same straight lines (i.e., forming two lines extending vertically in FIG. 5, parallel to and on either side of the lines of arrowheads 52); the inner circumferential walls of elements 40 and 50 do not protrude toward the center of the flow path (i.e., toward the lines of arrowheads 52 in FIG. 5), nor are they recessed in the direction away from the lines of arrowheads 52 in FIG. 5 (i.e., nor does the flow path protrude outward toward the left and right sides of the page of FIG. 5, at the location of elements 40 and 50). (It will be understood that while this discussion refers to, and FIG. 5 may seem to show, two parallel inner walls of the flow path, one on either side of the lines of arrowhead 52, in fact these two apparent 'walls' are not two physically separate elements but rather are part of the single cylindrical valve 22, as seen in FIG. 2. For, as will be recalled, FIG. 5 is a planar cross-sectional view of the valve 22 shown in FIG. 2. Thus, likewise, as shown by FIGS. 4A and 4B, each of the two elements 40 and the two elements 50 in FIG. 5 (one element 40 and one element 50 being disposed on each side of gate 20) is an annular member having a single inner circumferential wall, not two inner 'walls', one on each side of the flow path, as apparently shown in FIG. 5.)

Figure 5:
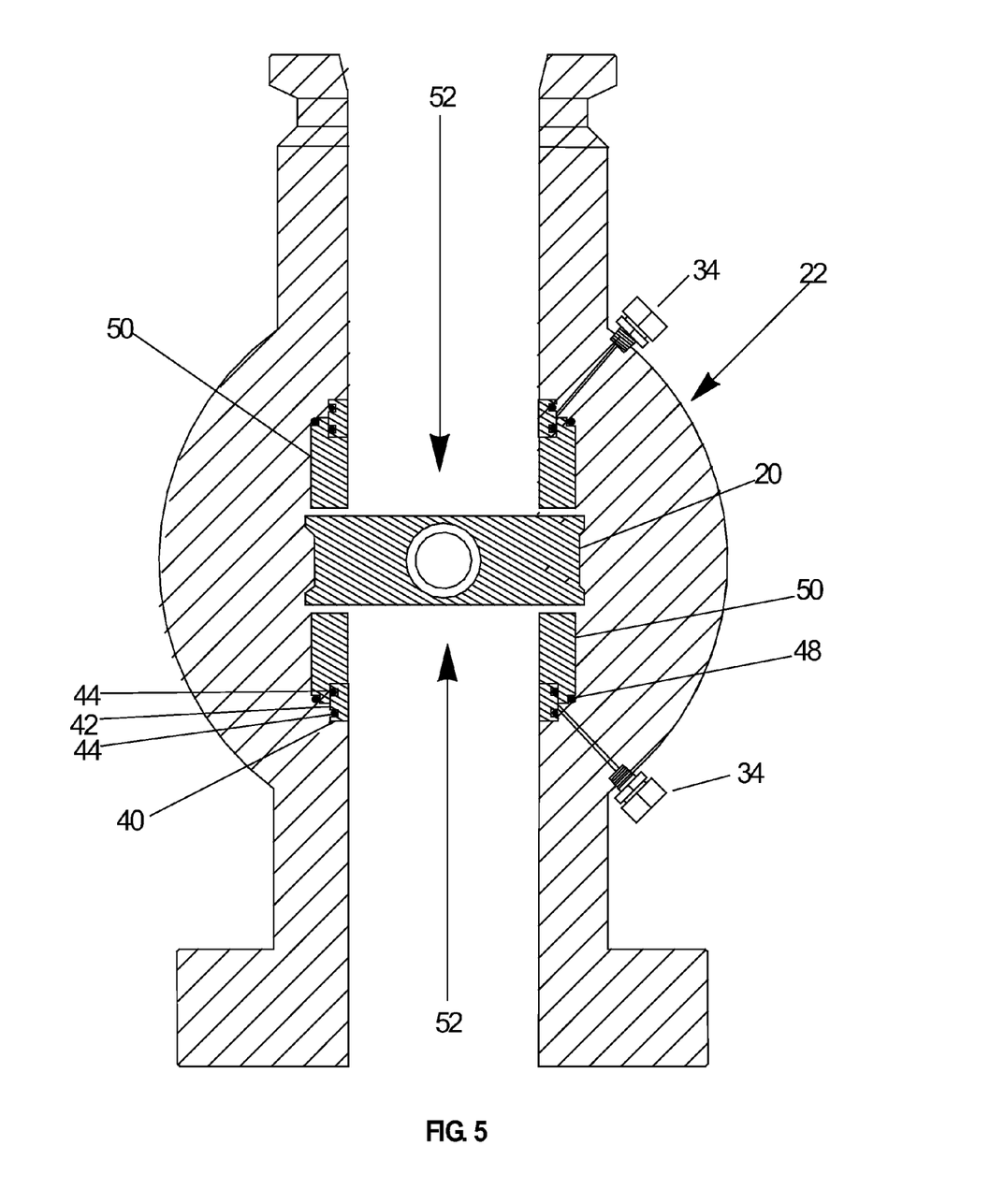
FIG. 5 is an enlarged version of FIG. 3A.
Figure 6:
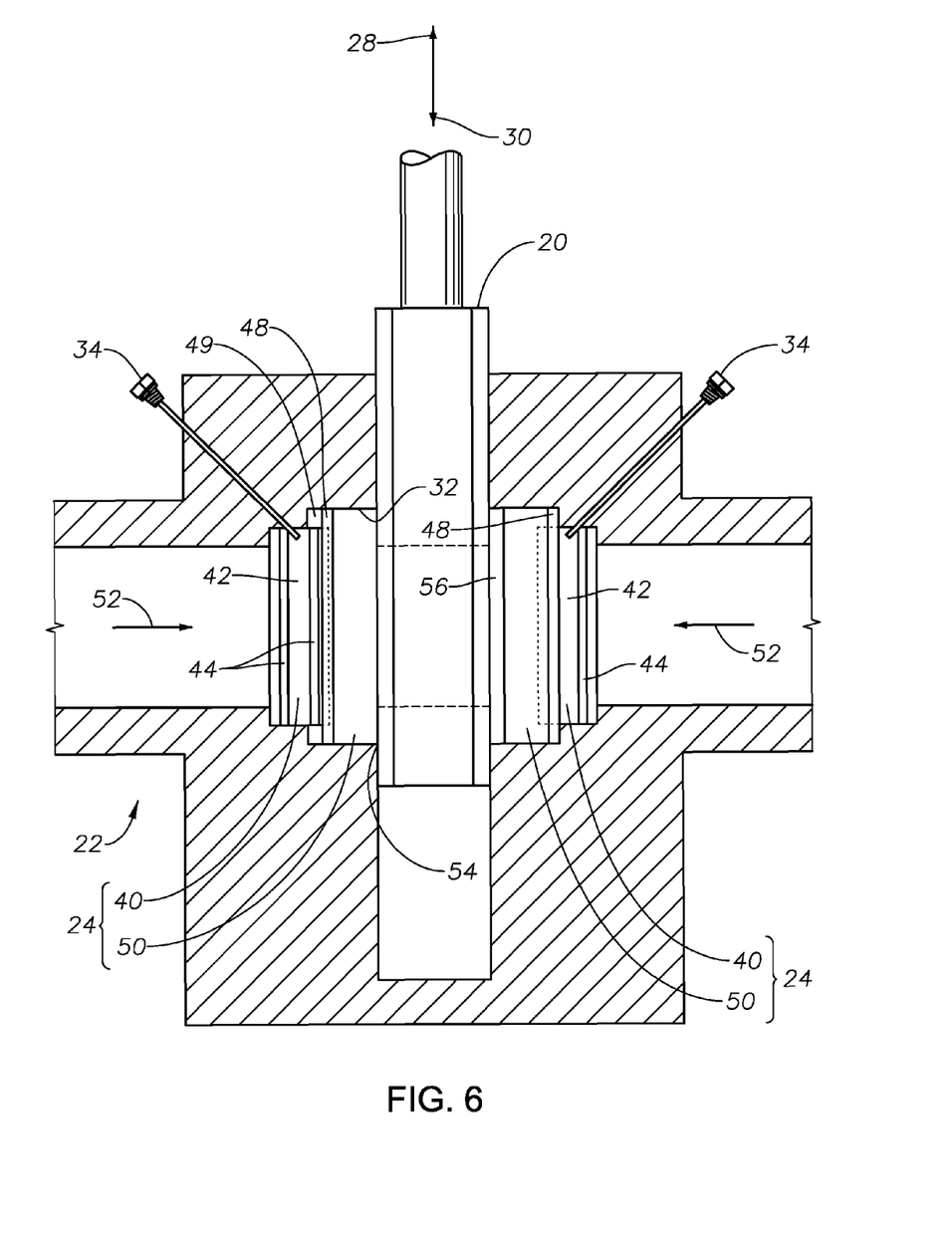
FIG. 6 illustrates operation of the energizable seal assemblies.

Outside pressure is injected through the injection ports 34 located in modified valve body 22, and into energizer seal assemblies 24 pocket area, as shown in FIG. 5. As seen in FIGS. 2, 3B, 5 and 6, injection ports 34 terminate at the outer circumferential surface of energizer ring bushings 40, respectively. As further seen in FIGS. 2, 3B, 5 and 6, injection ports 34 terminate at a location within a longitudinally central region of the outer circumferential surface of energizer ring bushings 40, respectively, specifically, at the location of energizer ring spacer 42 (seen more easily in FIG. 4). (Energizer ring bushings 40 are concentric with the aforementioned generally cylindrical portion of the valve body, so they share a longitudinal axis with that portion. This longitudinal axis extends horizontally in FIG. 2, as mentioned, and hence also extends horizontally in FIG. 6, where it is coincident with the lines of arrowheads 52. Accordingly, the longitudinal center of the outer circumferential surface of an energizer ring bushing 40 refers to the horizontal (left-right) center of the outer circumferential surface of the energizer ring bushing 40 shown in FIG. 6. A longitudinally central region means a region around the longitudinal center, i.e., extending somewhat to the right and left of the center in FIG. 6.) The pressure, injected at energizer ring spacer 42, is held by seals 44 and is transferred to the back of valve seat seals 48 located on the back of the valve seats 50. The applied pressure on back seals 48 on valve seats 50 forces (in the direction 52, as further depicted in FIG. 6) valve seats 50 against valve gate 20 creating a pressure seal area. This will be understood from FIG. 4B in conjunction with FIGS. 2, 5 and 6. Pressure (e.g., injected fluid) applied (from injection port 34, in the direction dictated by the angular orientation of the injection port 34 as seen in FIGS. 2, 5 and 6) at energizer ring spacer 42 pushes valve seat seal 48 in the direction shown by the arrows 52 (see, e.g., FIG. 4B). The arrows 52 indicate the same direction in FIGS. 2, 4B, 5 and 6. Thus, the force on valve seat seal 48 indicated in FIG. 4B by arrows 52 pushes valve seat 50 from a non-energized (released) position, in which valve seat 50 does not contact gate 20 (an example of which position is shown in FIG. 6 at right side), to an energized position, in which valve seat 50 contacts and presses against gate 20 (an example of which position is shown in FIG. 6 at left side). While injection pressure is applied through the injection ports 34 on modified valve body 22, no pressure can enter into the body cavity area 16 and valve gate 20 cannot be operated.

FIG. 6 shows the preferred embodiment in operation. In FIG. 6, the central portion of the figure, that is, gate 20 and energizer seal assemblies 24, are shown as in a side or elevation view, but seen from within the valve, while the periphery of the figure, that is, the valve body walls and the interior of the valve body, is shown in planar cross-section. The injection ports 34 are also shown as in a side or elevation view. The injection ports 34 are shown as lying in front of the planar cross-section of the valve body, and terminating on the outer circumferential surfaces of the energizer ring bushings 40, respectively. In terms of FIG. 2, FIG. 6 represents a view in which the viewer looks from behind the plane of the page of FIG. 2 and sees the planar cross-section of FIG. 2 from behind the plane of the page and sees the seal assemblies 24 and gate 20 in an elevation view. Thus, the thin tubular portions of injection ports 34 appear in front of the planar cross-section in FIG. 6 but behind the planar cross-section in FIG. 2. It will be understood that the seal assemblies 24 shown in FIG. 6 include the same elements as the seal assemblies 24 shown in FIGS. 4A and 4B, namely, elements 40, 42, 44 (which together make up element 36), 48, and 50. Referring to FIGS. 2 through 6, when outside pressure applied, valve seat 50 of energizer seal assembly 24 is forced against gate 20, closing or sealing 54 the area between the gate face and energizer seal assembly 24, as shown in the left side of FIG. 6. As seen, in the sealed position (or state), valve seat 50 overlaps energizer ring bushing 40 to a small degree. The dotted lines in the seal assembly 24 on the left side of FIG. 6 represent the portion of energizer ring bushing 40 that is behind (overlapped by) valve seat 50. As seen, in the sealed position, valve seat 50 does not overlap either of the two seals 44 (and hence also does not overlap any of the region of energizer ring spacer 42 between the seals 44) on energizer ring bushing 40. Reference numeral 49 refers to an open space inside the valve cavity that exists when seal assembly 24 is in the sealed position but not when seal assembly 24 is in the unsealed position. The right side of FIG. 6 shows the energizer seal assembly in the dormant or not energized state (i.e., unsealed position), when no outside pressure is injected, thus, not sealing 56 the area between the gate face and energizer seal assembly 24. Reference numeral 56 thus indicates a gap between valve seat 50 and gate 20 that exists when seal assembly 24 is in the unsealed position but not when seal assembly 24 is in the sealed position. As seen, in the unsealed position, valve seat 50 overlaps energizer ring bushing 40 to a greater degree than in the sealed position. The dotted lines in the seal assembly 24 on the right side of FIG. 6 represent the portion of energizer ring bushing 40 that is behind (overlapped by) valve seat 50. Specifically, in the unsealed position, valve seat 50 overlaps energizer ring bushing 40 to the extent of overlapping one of the seals 44 (i.e., on the right side of FIG. 6, the left seal 44, which is therefore not seen) and extending into the region of energizer ring spacer 42. The reason that valve seat 50 overlaps energizer ring bushing 40 to a greater extent in the unsealed position as compared to the sealed position is that in the sealed position valve seat 50 has been pushed away from energizer ring bushing 40 toward gate 20 to seal against gate 20, as described herein. The energizer seal assemblies 24 are preferably independently operated. For example, when gate 20 is in a closed state (prevent fluids from flowing), energizer seal assembly 24 on the upstream side can be activated and the energizer seal assembly 24 on the downstream side need not be activated because there is no fluid flow in that area. As shown, gate 20 in FIG. 6 is in the open state, as seen by the fact that the bore in gate 20 (indicated by horizontal dotted lines in gate 20) is aligned with the fluid flow path of the valve body. Gate 20 would be put in the closed state by sliding gate 20 downward in FIG. 6 so that the bore in gate 20 is fully below the fluid flow path and the solid portion of gate 20 above the bore is aligned with the fluid flow path.

The claimed invention solves many mechanical and safety issues and it greatly reduces the cost of repairs and potential for equipment failure.

When the fracturing and/or the flow back processes are complete, or the position of the gate needs to be changed, you simply release the pressure from the injection ports and all parts go back to their original positions.

Although the claimed invention has been described in detail with particular reference to these preferred embodiments, other embodiments can achieve the same results. Variations and modifications of the presently claimed invention will be obvious to those skilled in the art and it is intended to cover all such modifications and equivalents. The entire disclosures of all references, applications, patents, and publications cited above, are hereby incorporated by reference.

What is claimed is:
1. A method, comprising:
providing at least one seal assembly in a valve, each at least one seal assembly being (A) adjacent to a respective face of a gate in the valve, (B) disposed at least partly along a fluid flow path of the valve, and (C) disposed within a respective pocket formed in a body of the valve; and
energizing the at least one seal assembly comprising, for each at least one seal assembly, injecting a fluid to the respective pocket in which the respective seal assembly is disposed and not to the respective face of the gate, so as to compress each at least one seal assembly against the respective face of the gate,
wherein each at least one seal assembly comprises a valve seat and an energizer ring bushing, each of the valve seat and the energizer ring bushing configured as a respective substantially cylindrical member, wherein the valve seat comprises a valve seat seal on an outer circumferential surface of the valve seat, and wherein the energizer ring bushing comprises a plurality of seals on an outer circumferential surface of the energizer ring bushing.

2. The method of claim 1, wherein the energizing of the at least one seal assembly comprises, for each at least one seal assembly, pressurizing the respective pocket in which the respective seal assembly is disposed and transferring pressure accumulated in the respective pocket to a back of the valve seat seal in the respective seal assembly.

3. The method of claim 1, wherein the compressing of each at least one seal assembly comprises, for each at least one seal assembly, forcing the valve seat against the respective face of the gate.

4. The method of claim 1, further comprising decompressing each at least one seal assembly to reset the gate in the valve.

5. A system comprising:
means for sealing comprising at least one seal assembly in a valve, each at least one seal assembly being (A) adjacent to a respective face of a gate in the valve, (B) disposed at least partly along a fluid flow path of the valve, and (C) disposed within a respective pocket formed in a body of the valve; and
means for energizing the at least one seal assembly, configured, for each at least one seal assembly, to inject a fluid to the respective pocket in which the respective seal assembly is disposed and not to the respective face of the gate, so as to compress each at least one seal assembly against the respective face of the gate,
wherein each at least one seal assembly comprises a valve seat and an energizer ring bushing, each of the valve seat and the energizer ring bushing configured as a respective substantially cylindrical member, wherein the valve seat comprises a valve seat seal on an outer circumferential surface of the valve seat, and wherein the energizer ring bushing comprises a plurality of seals on an outer circumferential surface of the energizer ring bushing.

6. The system of claim 5, wherein the means for energizing the at least one seal assembly, is further configured, for each at least one seal assembly, by injecting the fluid, to pressurize the respective pocket in which the respective seal assembly is disposed so as to cause pressure accumulated in the respective pocket to be transferred to a back of the valve seat seal in the respective seal assembly.

7. The system of claim 5, wherein the means for energizing the at least one seal assembly is further configured, for each at least one seal assembly, by injecting the fluid, to cause the respective valve seat to be forced against the respective face of the gate.

8. The system of claim 5, wherein the means for energizing the at least one seal assembly is further configured to decompress each at least one seal assembly to reset the gate in the valve.

9. An apparatus comprising:
at least one seal assembly in a valve, each at least one seal assembly being (A) adjacent to a respective face of a gate in the valve, (B) disposed at least partly along a fluid flow path of the valve, and (C) disposed within a respective pocket formed in a body of the valve; and
at least one pressure injection port for energizing the at least one seal assembly, the at least one pressure injection port configured, for each at least one seal assembly, to inject a fluid to the respective pocket in which the respective seal assembly is disposed and not to the respective face of the gate, so as to compress each at least one seal assembly against the respective face of the gate,
wherein each at least one seal assembly comprises a valve seat and an energizer ring bushing, each of the valve seat and the energizer ring bushing configured as a respective substantially cylindrical member, wherein the valve seat comprises a valve seat seal on an outer circumferential surface of the valve seat, and wherein the energizer ring bushing comprises a plurality of seals on an outer circumferential surface of the energizer ring bushing.

10. The apparatus of claim 9, wherein each at least one pressure injection port is further configured, for each at least one seal assembly, by injecting the fluid, to pressurize the respective pocket in which the respective seal assembly is disposed so as to cause pressure accumulated in the respective pocket to be transferred to a respective back of the valve seat seal in the respective seal assembly.

11. The apparatus of claim 9,
wherein the at least one pressure injection port is further configured, for each at least one seal assembly, by injecting the fluid, to cause the valve seat thereof to be forced against the respective face of the gate.

12. The apparatus of claim 9,
wherein the at least one pressure injection port is further configured, by injecting the fluid, to cause each at least one seal assembly to be compressed against the respective face of the gate using solely fluid pressure.

13. The apparatus of claim 9,
wherein the at least one pressure injection port is further configured, by injecting the fluid, to cause each at least one seal assembly to be compressed against the respective face of the gate using solely hydraulic pressure.

14. The apparatus of claim 9,
wherein the at least one pressure injection port is further configured, by injecting the fluid, (A) to supply pressure from an external source of pressure and, (B) for each at least one seal assembly, to apply pressure to the respective seal assembly from the external source of pressure.

15. The apparatus of claim 9,
wherein, for each at least one seal assembly, a surface of the respective pocket formed in the body of the valve, within which pocket the respective seal assembly is disposed, is continuous with a respective surface of the body of the valve.

16. The apparatus of claim 9,
wherein, for each at least one seal assembly, (A) the valve seat contacts the respective face of the gate in a sealed position and not in an unsealed position, and (B) the energizer ring bushing does not contact the respective face of the gate in the sealed position or in the unsealed position.

17. The apparatus of claim 16, wherein, for each at least one seal assembly, a portion of the valve seat circumferentially overlaps a portion of the energizer ring bushing.

18. The apparatus of claim 17, wherein, for each at least one seal assembly, the portion of the valve seat circumferentially overlaps the portion of the energizer ring bushing with substantially no radially extending gap between the overlapping portion of the valve seat and the overlapped portion of the energizer ring bushing.

* * * * *

UNITED STATES PATENT AND TRADEMARK OFFICE
CERTIFICATE OF CORRECTION

PATENT NO. : 9,850,740 B2
APPLICATION NO. : 13/869744
DATED : December 26, 2017
INVENTOR(S) : Don Atencio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Twenty-fifth Day of September, 2018

Andrei Iancu
*Director of the United States Patent and Trademark Office*